(12) United States Patent
Wu et al.

(10) Patent No.: US 9,599,863 B2
(45) Date of Patent: Mar. 21, 2017

(54) LIQUID CRYSTAL DISPLAY (LCD) PANEL, MANUFACTURING METHOD THEREOF AND LCD DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Wenqing Zhao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 119 days.

(21) Appl. No.: 14/560,496

(22) Filed: Dec. 4, 2014

(65) Prior Publication Data

US 2016/0116781 A1 Apr. 28, 2016

(30) Foreign Application Priority Data

Oct. 28, 2014 (CN) .......................... 2014 1 0586697

(51) Int. Cl.
  *G02F 1/1339* (2006.01)
  *G02F 1/1333* (2006.01)

(52) U.S. Cl.
  CPC ...... *G02F 1/13394* (2013.01); *G02F 1/13338* (2013.01); *G02F 2001/13396* (2013.01); *G02F 2001/13398* (2013.01)

(58) Field of Classification Search
  None
  See application file for complete search history.

(56) References Cited

U.S. PATENT DOCUMENTS 6,266,121 B1 *  7/2001  Shigeta ............... G02F 1/13394
                                                       349/123
2006/0181668 A1  8/2006  Yamashita et al.
2008/0246906 A1 * 10/2008  Kim ..................... G02F 1/13394
                                                       349/106

(Continued)

FOREIGN PATENT DOCUMENTS

CN       101285970 A      10/2008
CN       101564551 A      10/2009

(Continued)

OTHER PUBLICATIONS

First Chinese Office Action dated Aug. 1, 2016; Appln. No. 201410586697.5.

(Continued)

*Primary Examiner* — Ryan Crockett
(74) *Attorney, Agent, or Firm* — Ladas & Parry LLP

(57) ABSTRACT

A liquid crystal display (LCD) panel, a manufacturing method thereof and an LCD device are provided. The LCD panel comprises: a first substrate and a second substrate arranged oppositely to form a liquid crystal cell; and post spacers disposed between the first substrate and the second substrate. The post spacers are prepared by shape memory polymer (SMP) materials. One end of the post spacers is disposed on the first substrate and the other end is opposite to the second substrate.

16 Claims, 7 Drawing Sheets

(56) References Cited

U.S. PATENT DOCUMENTS

| | | | | |
|---|---|---|---|---|
| 2009/0149617 A1* | 6/2009 | Gall | .................... | C08F 220/26 |
| | | | | 526/320 |
| 2013/0163255 A1* | 6/2013 | Kim | .................... | F21V 3/0436 |
| | | | | 362/311.04 |
| 2013/0300952 A1* | 11/2013 | Yeh | .................... | G02F 1/13338 |
| | | | | 349/12 |
| 2015/0226991 A1* | 8/2015 | Han | .................... | G02F 1/13394 |
| | | | | 349/43 |

FOREIGN PATENT DOCUMENTS

| | | | |
|---|---|---|---|
| CN | 101806974 A | 8/2010 |
| CN | 102012575 A | 4/2011 |
| CN | 102902108 A | 1/2013 |
| CN | 104231153 A | 12/2014 |

OTHER PUBLICATIONS

Second Chinese Office Action dated Jan. 18, 2017; Appln. No. 201410586697.5.

* cited by examiner

(a) EGPEA

(b) EGPEMA

(c) EGDMA

(d) AIBN

LIQUID CRYSTAL DISPLAY (LCD) PANEL, MANUFACTURING METHOD THEREOF AND LCD DEVICE

TECHNICAL FIELD

Embodiments of the present disclosure relate to a liquid crystal display (LCD) panel, a manufacturing method thereof and an LCD device.

BACKGROUND

In the field of display technology, LCD devices have dominated the display market due to the advantages such as low power consumption, low thickness, portability and so on. An LCD panel is an important component of the LCD device. The LCD panel may comprise a color filter (CF) substrate, an array substrate and a liquid crystal layer disposed in a liquid crystal cell formed by the CF substrate and the array substrate. When the CF substrate and the array substrate are arranged oppositely to form the liquid crystal cell, in order to maintain the cell gap between the CF substrate and the array substrate, post spacers may be provided on the CF substrate or the array substrate.

With the rapid development of display technology, touch screen panels have been gradually widely applied in people's lives. Currently, the touch screen panels may be divided into resistive type, capacitive type, infrared type, surface acoustic wave type and the like according to working principles. A touch screen panel may be formed by bonding a touch panel to a display panel and may also be formed in other ways. For example, based on configuration, capacitive touch screen panels may be divided into: add-on touch panels, on-cell touch panels, in-cell touch panels, or the like. The add-on touch panel is formed by separately producing a touch panel and an LCD panel and bonding the touch panel and the LCD panel together to form an LCD panel with touch function. In the on-cell touch panel, touch electrodes are formed on the outside of an LCD panel, so that the overall thickness of a display module can be reduced. In the in-cell touch panel, touch electrodes are embedded into an LCD panel, so that the overall thickness of a display module can be further reduced and the production cost of the touch panel can be greatly reduced.

SUMMARY

Embodiments of the present disclosure provide an LCD panel adopting a shape memory polymer (SMP) material to prepare spacers, a manufacturing method thereof and an LCD device comprising the LCD panel, which can avoid or alleviate the Mura phenomenon of the LCD panel and improve the display quality.

At least one embodiment of the present disclosure provides an LCD panel, which comprises: a first substrate and a second substrate arranged oppositely to form a liquid crystal cell; and post spacers disposed between the first substrate and the second substrate. The post spacers are prepared by an SMP material; and one end of the post spacers is disposed on the first substrate and the other end is opposite to the second substrate.

At least one embodiment of the present disclosure provides an LCD device, which comprises the foregoing LCD panel.

At least one embodiment of the present disclosure provides a method for manufacturing an LCD panel, which comprises: providing a first substrate; preparing post spacers on the first substrate with an SMP material; and providing a second substrate and arranging the second substrate and the first substrate oppositely to form a liquid crystal cell, wherein the post spacers are interposed between the first substrate and the second substrate.

BRIEF DESCRIPTION OF THE DRAWINGS

Simple description will be given below to the accompanying drawings of the embodiments to provide a more clear understanding of the technical proposals of the embodiments of the present disclosure. It will be obvious to those skilled in the art that the drawings described below only involve some embodiments of the present disclosure but are not intended to limit the present disclosure.

DETAILED DESCRIPTION

For more clear understanding of the objectives, technical proposals and advantages of the embodiments of the present disclosure, clear and complete description will be given below to the technical proposals of the embodiments of the present disclosure with reference to the accompanying drawings of the embodiments of the present disclosure. It will be obvious to those skilled in the art that the preferred embodiments are only partial embodiments of the present disclosure but not all the embodiments. All the other embodiments obtained by those skilled in the art without creative efforts on the basis of the embodiments of the present disclosure illustrated shall fall within the scope of protection of the present disclosure.

The inventors have noticed in the research that: in the use of a touch screen panel, when a user touches or presses the touch screen panel by a finger or a touch pen, due to the reasons such as stress in the manufacturing process, there is specific distance between end portions of post spacers in an LCD panel of the touch screen panel and an opposite substrate (namely the post spacers not bearing against the opposite substrate), so that liquid crystals in a pressed area are diffused outwards due to the pressing action, and in turn partial liquid crystals are pushed to the surrounding area of the LCD panel. Therefore, the LCD panel will suffer from the Mura phenomenon, and hence the display quality can be degraded. The stress in the manufacturing process is, for instance, caused when a touch panel and the LCD panel are bonded together by means of adhesive.

Figure 1:
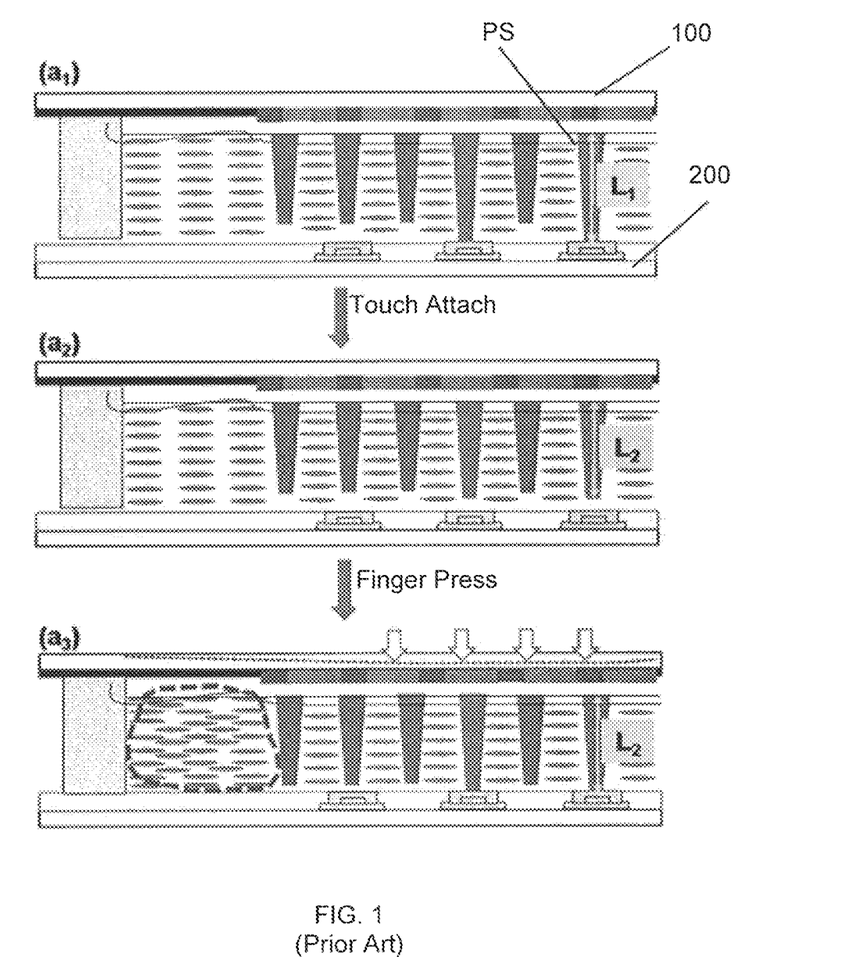
FIG. 1 is a schematic drawing illustrating the Mura phenomenon of an LCD panel in the working process due to the bonding process of a touch panel.

FIG. 1 is a schematic drawing illustrating the Mura phenomenon of the LCD panel in the working process due to the bonding process of the touch panel. Post spacers (PS) in the LCD panel in the state (a1) as shown in the figure have a height L1 and bear against an upper substrate 100 and a lower substrate 200 to maintain the required cell gap. When the touch panel is bonded to a display side (for instance, the upper side in the figure) of the LCD panel, the LCD panel is subjected to certain pressure. Moreover, due to the overall contact between the touch panel and the LCD panel, the acting time of the pressure is longer, and hence partial post spacers in the PCD panel may be subjected to shape deformation and the height of the post spacers is reduced from L1 to L2. Therefore, there is certain space between the end portions of the post spacers and the opposite lower substrate 200. At this point, the LCD panel is in the state (a2) as shown in the figure. In the use of the touch screen panel, when the touch screen panel is pressed by a finger, as the LCD panel is correspondingly under pressure, the post spacers in the pressed area, the height of which is converted into L2, will move towards the opposite lower substrate 200, so that the cell gap of the pressed area is reduced, and in turn a portion of the liquid crystals will be pushed away. Moreover, a portion of the liquid crystals are pushed to the surrounding area (an area marked by dotted lines in the figure) of the LCD panel, and hence the Mura phenomenon is caused. At this point, the LCD panel is in the state (a3) as shown in the figure.

The shape memory phenomenon refers to the phenomenon in which a product with an original shape is deformed and possess a certain shape, and then the stimulation of corresponding environmental change (such as temperature, force, electromagnet, solvent or PH value) can be sensed by the product, and mechanical parameters of the product are adjusted, and hence the product is restored to the default state. The shape memory polymer (SMP) materials, as a kind of functional polymer materials, have become novel shape memory materials that are rapidly developed in recent years due to the advantages such as a large deformation degree, shape recovery temperature capable of being adjusted by a chemical method and having a wide range, low shape recovery stress, low price and the like.

Based on the shape recovery principles, SMP materials can be divided into thermally-induced SMP materials, electro-active SMP materials, light-induced SMP materials and chemically induced SMP materials. The thermally-induced SMP materials, for instance, may be deformed at the temperature larger than the room temperature and can maintain the deformation at the room temperature, and thus can be stored for a long term. When the temperature is raised to a specific response temperature, the device prepared by the SMP materials can be quickly restored to the original shape.

Figures 2A, 2B:
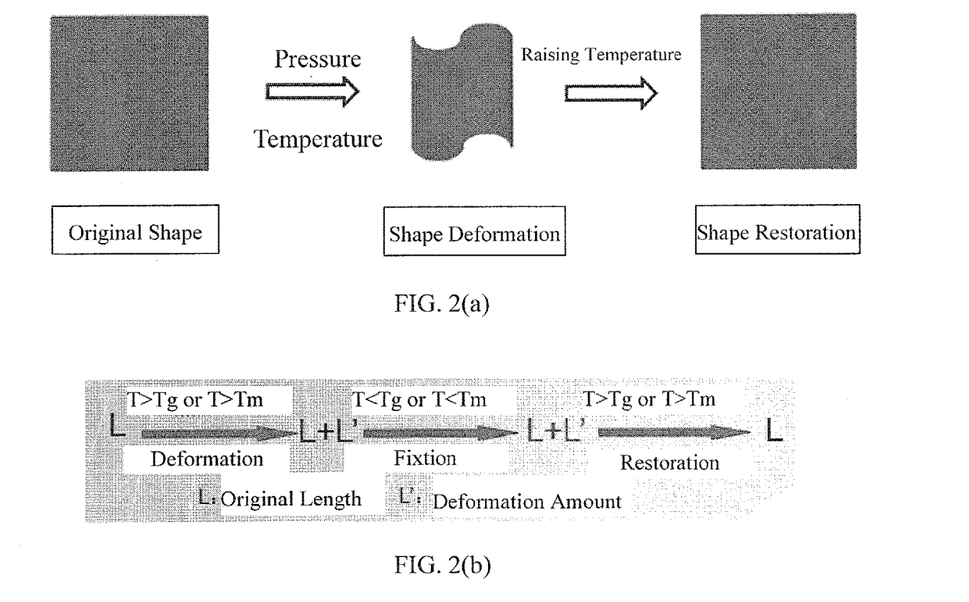
FIGS. 2(a) and 2(b) are schematic drawings illustrating the shape memory processes of thermally-induced SMP materials.

FIGS. 2(a) and 2(b) are schematic drawings illustrating the shape memory processes of the thermally-induced SMP materials. Firstly, for instance, a powdered or granular material is heated to melt, and the molten material is injected into a mold and molded and cooled to obtain a product with a desired shape, namely with an original shape (a sheet product is taken as an example in the figure) and a length L. Secondly, the product in the original state is heated to an appropriate temperature (e.g., the crystalline melting transition temperature (Tm) or the glass transition temperature (Tg)) or more. The material presents limited liquidity as a whole. At this point, an external force is applied the product to deform the product (folding is taken as an example in the figure), and in this case, the deformed product has a length L+L'. Thirdly, the product is cooled while the external force is continuously applied, so that the product still maintains the generated shape after the external force is removed, and hence a new stable shape, namely a deformed state, is obtained. If the original state needs to be restored, the product in the deformed state is heated to the shape memory transition temperature (shape recovery temperature), e.g., Tm or Tg, and hence the product is macroscopically restored to the original state prior to deformation, namely shape recovery is achieved. At this point, the length of the product is restored to L.

At least one embodiment of the present disclosure provides an LCD device employing an SMP material to prepare post spacers in an LCD panel, and a manufacturing method thereof. Detailed description will be given below to the embodiments of the present disclosure with reference to preferred embodiments.

At least one embodiment of the present disclosure provides an LCD device, which comprises an LCD panel. The LCD panel comprises: a first substrate and a second substrate arranged oppositely to form a liquid crystal cell; and post spacers disposed between the first substrate and the second substrate. The post spacers are prepared by an SMP material. One end of the post spacer is disposed on the first substrate and the other end is opposite to the second substrate.

For instance, one of the first substrate and the second substrate assembled together to form the liquid crystal cell is an array substrate and the other is an opposing substrate; the first substrate and the second substrate are hermetically bonded together with sealant (not shown in the figure) to obtain the liquid crystal cell; and liquid crystals for display are filled in the liquid crystal cell. In general, the side of the opposing substrate is the display side of the LCD panel. The array substrate includes a plurality of gate lines and a plurality of data lines; the gate lines and the data lines are intercrossed to define sub-pixel units arranged in an array; and each sub-pixel unit includes a thin-film transistor (TFT) taken as a switching element and a pixel electrode and a common electrode configured to control the arrangement of the liquid crystals. The opposing substrate is, for instance, a color filter (CF) substrate. The CF substrate is provided with an array of CF units corresponding to the array of the sub-pixel units on the array substrate. For instance, the array of the CF units may include the combination of red CF units, green CF units and blue CF units arranged in sequence. The CF substrate may further comprise a black matrix to avoid the phenomenon of crosstalk or light leakage between the sub-pixel units. When the black matrix or the array of CF units are formed on the array substrate, the black matrix or the array of the CF units are not required to be formed on the opposing substrate.

Figure 3:
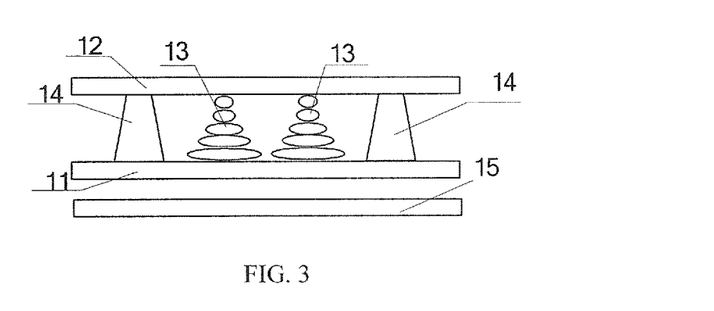
FIG. 3 is a schematic structural partial view of an LCD device provided by one embodiment of the present disclosure.

FIG. 3 is a schematic structural partial view of an LCD device provided by one embodiment of the present disclosure. As illustrated in FIG. 3, the LCD device comprises an LCD panel which includes an array substrate 11, a CF substrate 12 and liquid crystals 13 filled between the array substrate 11 and the CF substrate 12. The array substrate 11 and the CF substrate 12 are subjected to cell-assembly process to form a sealed liquid crystal cell via sealant (not shown), and the liquid crystals 13 are sealed in the liquid crystal cell. As a uniform cell gap is important to the display quality, a plurality of post spacers 14 is disposed between the array substrate 11 and the CF substrate 12. In the embodiment, the post spacers are made from an SMP material. In the case of large rigidity, the post spacers 14 can well support the CF substrate 12 and prevent the CF substrate 12 from being deformed under the action of an external force.

The LCD panel in the embodiment further includes a backlight module 15 arranged at the rear of the array substrate 11. The backlight module 15 is disposed on a non-display side of the LCD panel and configured to provide the light source for display. The backlight module 15 may adopt side-light type or direct-light type, and the adopted light source may be a cold cathode fluorescence lamp (CCFL), a light-emitting diode (LED) or the like. The embodiment of the present disclosure is not limited thereto. In the embodiment, the LCD panel may be of a transmissive type or a transflective type.

In another embodiment of the present disclosure, the LCD panel may be of a reflective type. In this case, no backlight module must be additionally arranged for the LCD panel.

In the embodiment of the present disclosure, the post spacers made from the SMP material may be formed on the array substrate or the opposing substrate (e.g., the CF substrate). However, no matter which substrate is provided with the post spacers, when the first substrate and the second substrate (e.g., the array substrate and the opposing substrate) are assembled together to form the liquid crystal cell, the post spacers are interposed between the two substrates and configured to maintain the cell gap of the liquid crystal cell (namely the space between the substrates).

Figure 4:
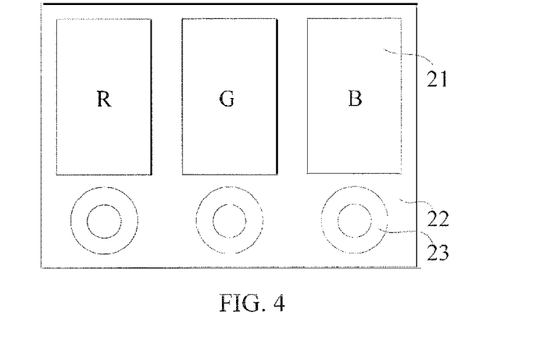
FIG. 4 is a schematic drawing of an illustrative structure, in which post spacers are formed on a CF substrate, in one embodiment of the present disclosure.

FIG. 4 is a schematic drawing of an illustrative structure, in which post spacers are formed on the CF substrate, in one embodiment of the present disclosure. As illustrated in FIG. 4, the CF substrate includes a black matrix 22 and RGB CF units 21 formed on a base substrate; the black matrix 22 is provided with opening areas corresponding to the RGB CF units 21 arranged in sequence; the post spacers 23 for supporting the CF substrate and the array substrate are disposed at the non-opening areas of the black matrix 22; and the post spacers 23 are made from a SMP material. In the example as shown in FIG. 4, the cross sectional shape of the post spacers is round (circle), and the cross sectional area of the upper end may be less than that of the lower end.

In at least one embodiment of the present disclosure, the LCD panel may further comprise auxiliary spacers (e.g., also post spacers). The auxiliary spacers are, for instance, disposed on the first substrate together with the post spacers (primary post spacers) made from the SMP material, and tail ends of the auxiliary spacers are opposite to the second substrate. In this case, the post spacers made from the SMP material are primary spacers. The height of the auxiliary spacers on the first substrate is lower (or shorter) than that of the primary spacers. Therefore, when the first substrate and the second substrate are assembled together to form the liquid crystal cell, the tail ends of the auxiliary spacers may not bear against the second substrate and are spaced from the second substrate at a certain distance. The auxiliary spacers may be also made from the SMP material the same as the primary spacers, and hence the two spacers may be formed in the same preparation process. Or the auxiliary spacers may be made from a traditional spacer preparation material, e.g., acrylic resin, as different from the primary spacers.

The primary spacers and the auxiliary spacers may have various shapes, for instance, may have round, elliptical, rectangular, square and triangular cross sections, and for instance, may be formed at positions corresponding to the TFTs of the sub-pixel units or at positions corresponding to the gate lines or the data lines, on the first substrate or the second substrate. But the present disclosure is not limited to the preferred embodiments.

Figure 5:
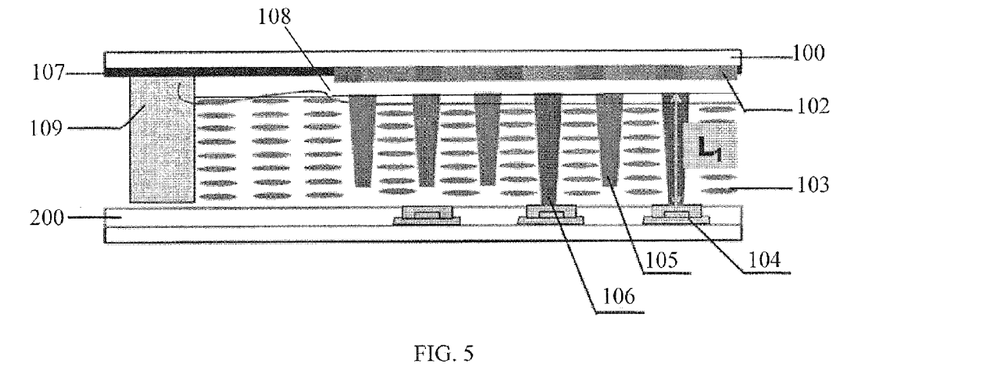
FIG. 5 is a schematic structural partial view of an LCD panel provided by another embodiment of the present disclosure.

FIG. 5 is a schematic structural partial view of an LCD panel provided by another embodiment of the present disclosure. As illustrated in FIG. 5, the LCD panel comprises a CF substrate 100 and an array substrate 200 arranged opposite to each other; the CF substrate 100 and the array substrate 200 are assembled together to form a sealed liquid crystal cell via sealant 109 coated along a surrounding area; and liquid crystals 103 are filled in the liquid crystal cell. The CF substrate 100 includes a black matrix 107 and a CF layer 102 formed at an opening area of the black matrix. The CF layer 102 includes CF units (e.g., RGB CF units) arranged in an array. In addition, a planarization layer 108 is also provided on the black matrix 107 and the CF layer 102, so as to planarize or flat the surface of the CF substrate 100. The array substrate 200 includes sub-pixel units formed thereon. Each sub-pixel unit includes a TFT device 104 taken as a switching element. For instance, primary spacers 106 made from an SMP material and auxiliary spacers 105 made from a non-SMP material are disposed between the CF substrate 100 and the array substrate 200. Both the primary spacers 106 and the auxiliary spacers 105 are formed on the CF substrate 100 and projected towards the array substrate 200, and end portions of the spacers are opposite to the array substrate 200. The primary spacers 106 bear against the CF substrate 100 and the array substrate 200, so as to maintain the cell gap between the CF substrate 100 and the array substrate 20. Meanwhile, as required, the LCD panel may be or not provided with a backlight module.

Figure 6:
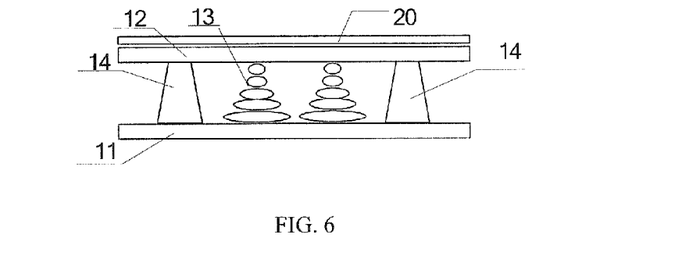
FIG. 6 is a schematic structural partial view of a touch screen panel provided by one embodiment of the present disclosure.

The LCD device provided by at least one embodiment of the present disclosure is a touch screen panel with touch function. The touch screen panel may be of resistive type, capacitive type, infrared type, surface acoustic wave type or the like. On the basis of an LCD panel, the touch screen panel further comprises a touch panel with the touch function, or a touch electrode structure is formed in the LCD panel. FIG. 6 is a schematic structural partial view of a touch screen panel provided by one embodiment of the present disclosure. The touch screen panel provided by the embodiment is obtained by additionally arranging a touch panel 20 on a display side on the basis of the LCD panel as shown in FIG. 3. Correspondingly, the touch panel 20 may be a touch panel of any type, e.g., resistive type, capacitive type, infrared type or surface acoustic wave type.

In a touch screen panel provided by another embodiment of the present disclosure, a touch electrode structure is formed in a display panel. The touch electrode structure is, for instance, configured to form a resistive or capacitive touch circuit. For instance, the capacitive touch screen panel may be divided into a self-capacitance touch screen panel or a mutual-capacitance touch screen panel. The touch electrode structure may be at least partially formed on the first substrate or the second substrate.

Figure 7A:
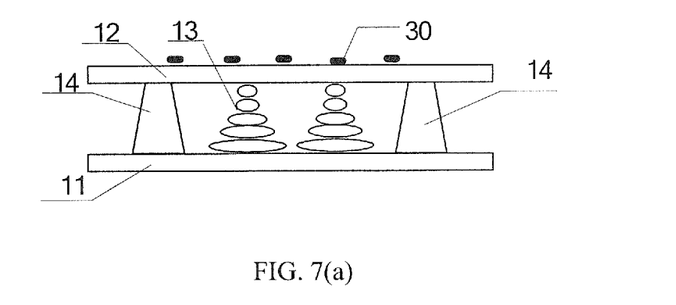
FIGS. 7(a) to 7(c) are schematic structural partial views of a touch screen panel provided by the embodiment of the present disclosure.
Figure 7B:
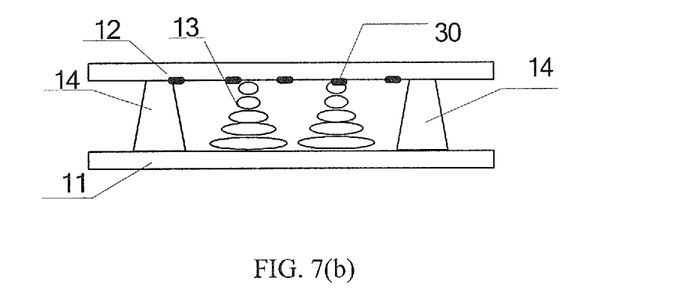
Figure 7C:
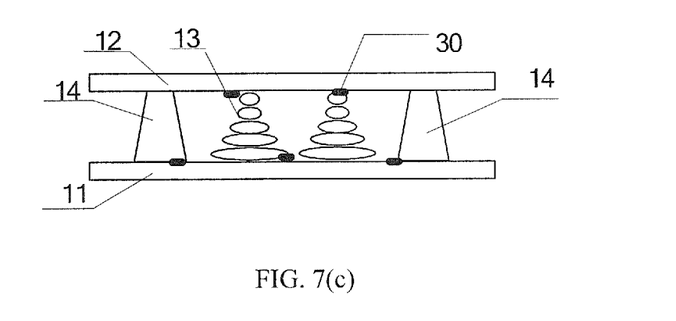

For instance, in a touch screen panel provided by the embodiment as shown in FIG. 7(a), a touch electrode structure 30 is formed on the outer side of the first substrate; in a touch screen panel provided by the embodiment as shown in FIG. 7(b), a touch electrode structure 30 is formed on the inner side of the first substrate; and in a touch screen panel provided by the embodiment as shown in FIG. 7(c)

one part of a touch electrode structure 30 (e.g., touch sensing electrodes) are formed on the inner side of the first substrate and the other part of the touch electrode structure 30 (e.g., touch driving electrodes) are formed on the inner side of the second substrate. A touch chip connected with the touch electrode structure, for instance, may be disposed on the first substrate or the second substrate or may be connected to the first substrate or the second substrate through a flexible printed circuit (FPC) board.

The structure of the touch screen panel provided by the embodiment of the present disclosure is not limited to the specific structures and can be achieved by any touch structure capable of being combined with the LCD panel in relevant technical field.

In the embodiments of the present disclosure, SMPs for preparing the post spacers may be made from a plurality of appropriate materials, e.g., cross-linked polyolefin, polyurethane or polyester.

Appropriate degree of crystallinity and appropriate degree of cross-linking can be controlled through physical cross-linking or chemical cross-linking method, so that macromolecular chains are cross-linked into a network structure functioning as a stationary phase, and crystals that can be formed and melted function as a reversible phase in the network structure, and hence cross-linked polyethylene with shape-memory effect can be obtained. Common polyolefin-based polymers for preparing the shape memory materials include polyethylene, ethylene-vinyl acetate copolymer (EVA), polyvinyl chloride, polyvinylidene chloride, polytetrafluoroethylene, etc.

Polyurethane is generally prepared by the reaction of polyisocyanate, polyether or polyester, and a chain extender. Polyurethane shape memory materials with different critical memory temperatures can be obtained through the adjustment of the variety, content and the like of soft sectors and hard sectors in polyurethane molecules. If the glass temperature Tg is set within the range of the room temperature, shape memory polyurethanes at the room temperature can be obtained.

Polyester is a kind of polymer, the macromolecular main chain of which contains a carbonyl ester bond. The shape-memory function can be also obtained by peroxide cross-linking or radiation cross-linking. Shape memory polyester with different response temperatures can be also prepared through the adjustment of the proportion of carboxylic acid and polyhydric alcohol components in the polymer.

Figure 8:
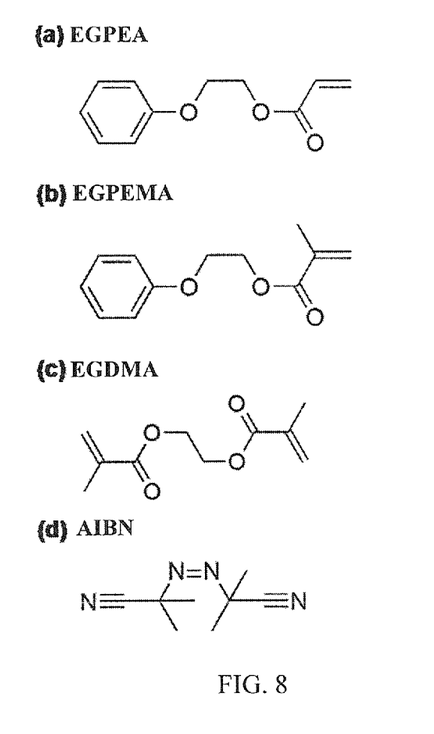
FIG. 8 illustrates structural formulas of initial monomers and other components of an SMP material.
Figure 9:
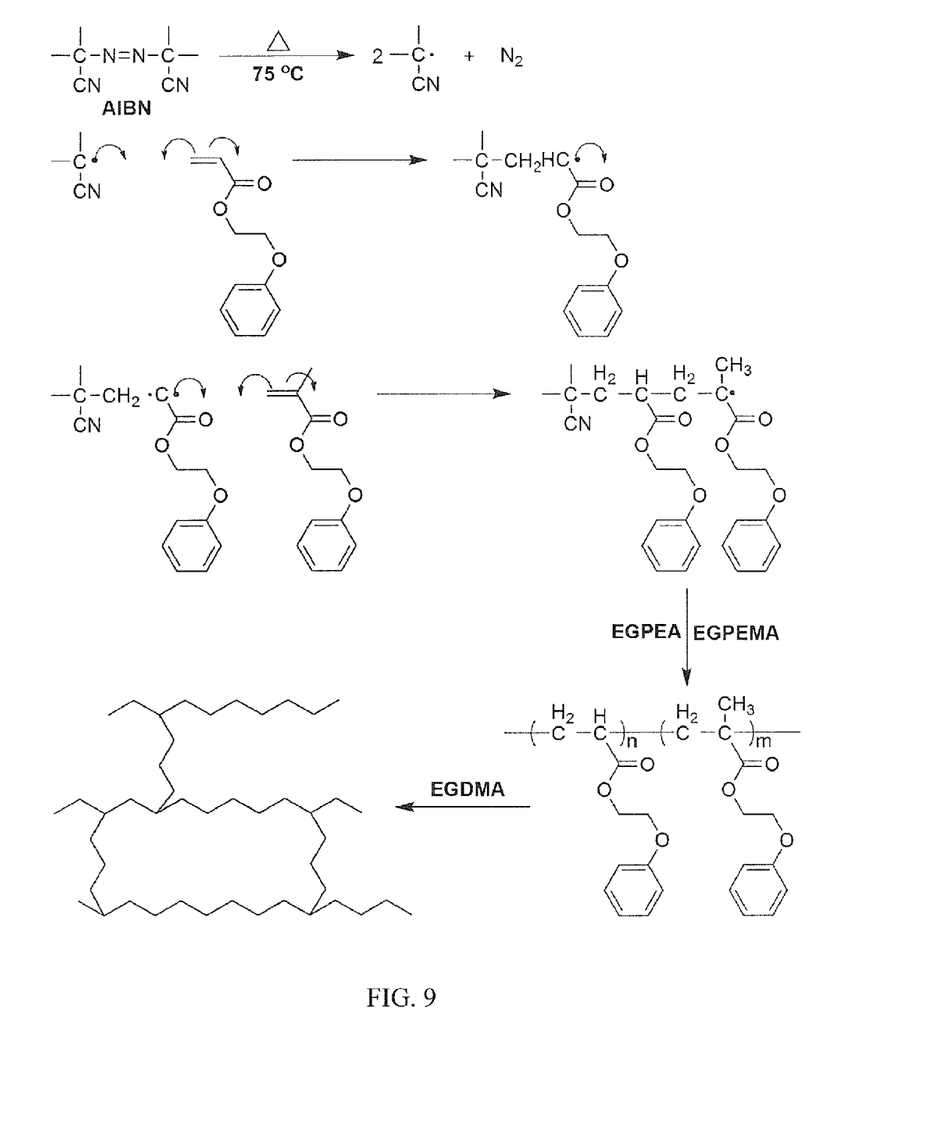
FIG. 9 is a schematic drawing illustrating the synthesis mechanism of EGPEA/EGPEMA copolymer.

In at least one embodiment of the present disclosure, the SMP material for preparing the post spacers in the LCD panel is ethylene glycol phenyl ether acrylate (EGPEA)/ethylene glycol phenyl ether methacrylate (EGPEMA) copolymer. The material is prepared by taking EGPEA and EGPEMA as initial monomers, ethylene glycol dimethacrylate (EGDMA) as a cross-linking agent, and azobisisobutyronitrile (AIBN) as a radical initiator, and adopting the thermal polymerization method. FIG. 8 illustrates structural formulas of initial monomers and other components of the SMP material. FIG. 9 is a schematic drawing illustrating the synthesis mechanism of the EGPEA/EGPEMA copolymer.

The copolymer has shape-memory effect. That is to say, as for the product made from the material with an original shape, when pressure is applied to the product or the temperature is changed, the product will be deformed; and when the temperature is raised again to be more than or less than the shape memory transition temperature of the materials, the product will be correspondingly restored to the original shape.

Figure 10:
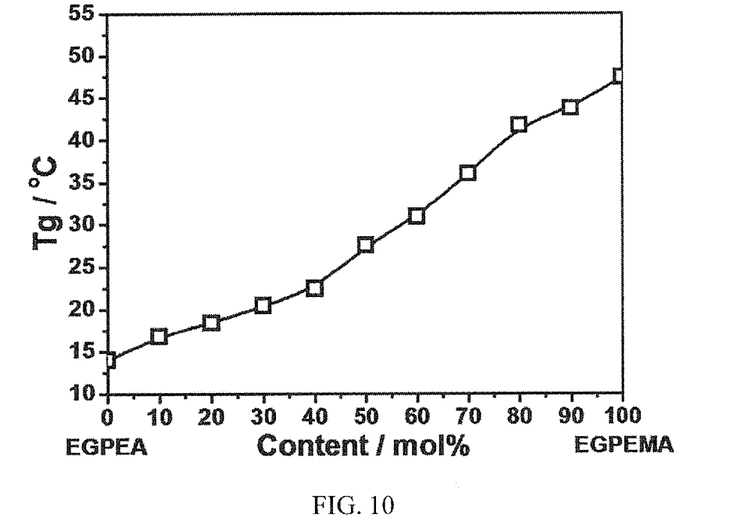
FIG. 10 illustrates a change curve of the shape memory transition temperature Tg along with the proportion of EGPEA monomer.

The shape memory transition temperature (glass transition temperature) Tg of the EGPEA/EGPEMA copolymer can be adjusted through the adjustment of the proportion of the monomers EGPEA and EGPEMA, the content of the cross-linking agent EGDMA, and the content of the initiator AIBN. FIG. 10 illustrates a change curve of the shape memory transition temperature Tg of the EGPEA/EGPEMA copolymer along with the proportion of the monomers EGPEA and EGPEMA. As seen from FIG. 10, along with the increase of the content of the monomer EGPEMA, the transition temperature Tg of the copolymer is gradually increased mainly due to the fact that methacrylate ester improves the rigidity of the polymer backbone.

In one embodiment of the present disclosure, in order to prepare the EGPEA/EGPEMA copolymer, at first, monomers EGPEA and EGPEMA are uniformly mixed according to the mole ratio between 10:0 to 0:10; cross-linking agent EGDMA of which the mole ratio is more than 0 but less than or equal to 10% (0%~10%) is added into the mixture; and initiator AIBN with the mass ratio of 0.1% to 0.9% is added into the mixture. Subsequently, the mixture is stirred and mixed; inert gas such as nitrogen is introduced to expel oxygen in the environment; the obtained product is added at a constant temperature of, for instance, 65 to 85 degree centigrade (e.g., 75 degree centigrade) and reacts for 12 to 36 hours (e.g., 24 hours) to obtain the copolymer; and the shape memory transition temperature (namely Tg) of the copolymer is measured.

In one embodiment of the present disclosure, the shape memory transition temperature of the SMP materials for preparing the post spacers may be adjusted to be ranged from 20 to 45 degree centigrade. The temperature range is, for instance, the heating temperature range of a handheld device such as smart phones in a normal use state. The device temperature may be raised due to the heat generated by the backlight module of the LCD panel and circuits (e.g., a processor), battery, etc. of the device. Therefore, when the handheld device works, the temperature of the LCD panel is raised due to the heat generated by the handheld device, so that the shape of the post spacers made from the SMP material is restored to the previous original height, and hence the uniformity of the cell gap can be better maintained.

In another embodiment of the present disclosure, the shape transition temperature of the SMP materials for preparing the post spacers is close to 37 degree centigrade, namely is the body temperature or so (e.g., ±3° C.). In this case, as for the touch screen panel provided by the embodiment of the present disclosure, when a finger of the human body touches the touch screen panel in the working process of the touch screen panel, the shape of the post spacers made from the SMP material may be restored.

Figure 11:
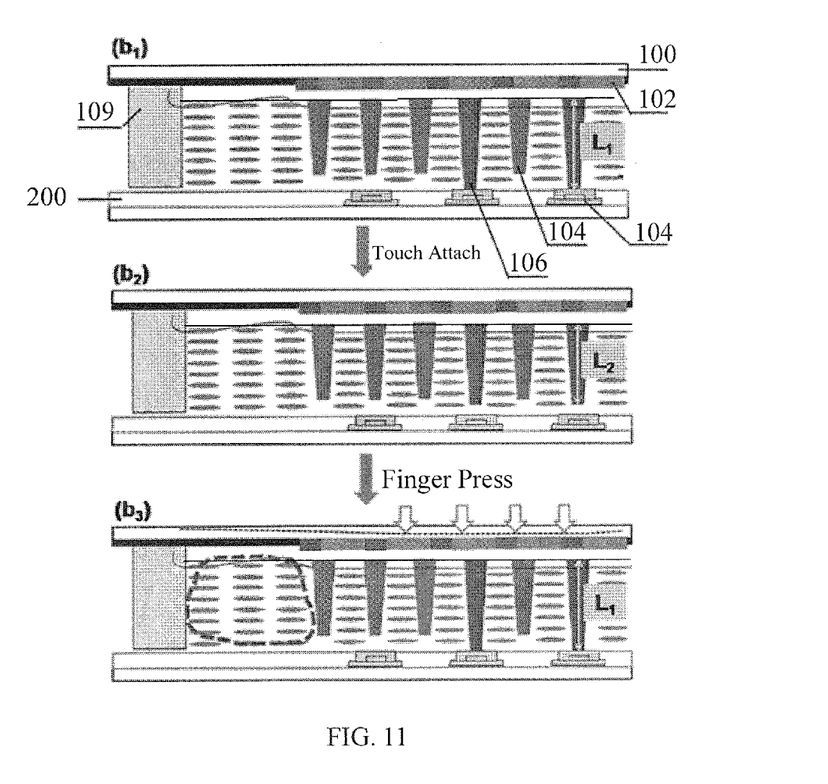
FIG. 11 is a schematic drawing illustrating the state when an LCD panel provided by one embodiment of the present disclosure overcomes the Mura phenomenon.

FIG. 11 is a schematic drawing illustrating the state when the Mura phenomenon is overcome in one embodiment of the present disclosure. The description is based on the embodiment as shown in FIG. 5. Moreover, the SMP material for preparing the primary spacers 106 is EGPEA/EGPEMA copolymer, and the shape memory transition temperature Tg is adjusted to be close to 37 degree centigrade.

As illustrated in FIG. 11, in the LCD panel in the state (b1) as shown in the figure, the primary post spacers 106 prepared by the SMP materials has height L1 and bear against the upper substrate 100 and the lower substrate 200 to maintain the required cell gap. When a touch panel is bonded to a display side of the LCD panel, the LCD panel is subjected to specific pressure; as the touch panel and the LCD panel contact each other as a whole, the acting time of the pressure is longer, and hence a portion of the primary post spacers 106 in the LCD panel may be subjected to shape deformation; the height of the primary post spacers 106 is reduced from L1 to L2, and hence there is a certain distance between the primary post spacers 106 and the opposite lower substrate 200; and at this point, the LCD panel is in the state (b2) as shown in the figure. In the use of the touch screen panel, when the touch screen panel is pressed by a finger, the temperature of the area pressed by the finger is raised due to the body temperature, for instance, raised to be close to the body temperature, or is raised due to the heat generated in the working process. As the post spacers prepared by the EGPEA/EGPEMA copolymer has a shape recovery function when the temperature is close to the glass transition temperature thereof, the height of the primary spacers 106 will be restored to the previous original height L1, for instance, the primary spacers 106 bear against the lower substrate 200 again and repossess supporting function. In this case, liquid crystals at the pressed area will not be diffused to the surrounding area and the amount of the liquid crystals at an area surrounded by dotted lines will not be increased, and hence the Mura phenomenon can be effectively avoided. At this point, the LCD panel is in the state (b3) as shown in the figure.

Another embodiment of the present disclosure provides a method for manufacturing an LCD panel, which comprises: providing a first substrate; preparing post spacers on the first substrate with an SMP material; and providing a second substrate and arranging the second substrate and the first substrate oppositely to form a liquid crystal cell, wherein the post spacers are interposed between the first substrate and the second substrate. One end of the post spacer is disposed on the first substrate and the other end is opposite to the second substrate.

According to another embodiment of the present disclosure, the method for manufacturing the LCD panel further comprises: preparing auxiliary spacers on the first substrate, wherein the height of the auxiliary spacers on the first substrate is lower than that of the post spacers.

According to another embodiment of the present disclosure, the method for manufacturing the LCD panel further comprises: providing a backlight module disposed on a non-display side of the LCD panel.

According to another embodiment of the present disclosure, the method for manufacturing the LCD panel further comprises: providing a touch panel bonded to a display side of the LCD panel.

According to another embodiment of the present disclosure, the LCD panel comprises a touch electrode structure which is at least partially formed on the first substrate or the second substrate.

In the embodiments of the present disclosure, for instance, the SMP material includes cross-linked polyolefin, polyurethane or polyester; for instance, the SMP material is EGPEA/EGPEMA copolymer; and for instance, the shape memory transition temperature (e.g., the crystalline melting transition temperature (Tm) or the glass transition temperature (Tg)) of the SMP material is ranged from 20 to 45 degree centigrade or close to 37 degree centigrade.

In the embodiment of the present disclosure, the method for preparing the post spacers by the SMP materials may be a printing method, a photolithographic method or the like. When a photolithographic method is adopted, for instance, an SMP material layer is formed (coated or deposited) on the substrate; a photoresist layer is coated on the SMP material layer; the photoresist is subjected to exposure and then development to obtain a photoresist pattern; the photoresist pattern is taken as an etching mask to etch the SMP material layer; and hence the post spacers are obtained.

If the primary spacers with a greater height and the auxiliary spacers with a smaller height are expected to be prepared at the same time, for instance, a gray-tone mask or a half-tone mask is adopted in the case of photoresist exposure, and the exposed photoresist layer is developed to obtain the photoresist pattern. As for the photoresist pattern, the photoresist at areas of the primary spacers has a larger thickness; the photoresist at areas of the auxiliary spacers has a smaller thickness; and no photoresist is retained at areas without spacers. Firstly, etching is performed to remove the SMP material in the areas without the spacers; secondly, the photoresist ashing process is performed to reduce the thickness of the photoresist layer, so as to remove the SMP material at the areas of the auxiliary spacers but retain the photoresist in the areas of the primary spacers; thirdly, second etching is performed to reduce the height of the auxiliary spacers; and fourthly, the remaining photoresist on the primary spacers is removed, and hence the primary spacers and the auxiliary spacers with different heights are formed on the substrate in the same process.

Three specific examples are given below for the purpose of understanding by taking EGPEA/EGPEMA copolymer as an example.

Example 1

Firstly, the EGPEA/EGPEMA copolymer is prepared. Monomers EGPEA and EGPEMA are uniformly mixed according to the mole ratio of 1:1; cross-linking agent EGDMA with the mole ratio of 1% is added into the mixture; initiator AIBN with the mass ratio of 0.3% is added into the mixture; the mixture is stirred and mixed; meanwhile, nitrogen is introduced to remove oxygen therein; and the obtained product is added at a constant temperature of 75 degree centigrade and reacts for 24 hours to obtain the copolymer. The shape memory transition temperature (Tg) of the copolymer is 26.5 degree centigrade in test.

Secondly, the above prepared EGPEA/EGPEMA copolymer is adopted to prepare post spacers on a CF substrate of an LCD panel. The CF substrate has been provided with a black matrix and CF units. The post spacers are prepared by a photolithographic method.

Thirdly, sealant is coated along the periphery of the CF substrate; the CF substrate and an array substrate are combined to form a liquid crystal cell; liquid crystals are added into the liquid crystal cell; and hence the LCD panel is obtained.

In addition, a touch panel is prepared and bonded and fixed on a display side of the LCD panel, and hence a touch screen panel is obtained.

Then, the manufactured touch screen panel is tested. The touch screen panel is charged and a display signal is input into the touch screen panel. At this point, the touch screen panel is pressed by a finger or a touch pen, and whether the touch screen panel has the Mura phenomenon is observed. As shown by the test result, the touch screen panel in the example has no observable Mura phenomenon.

Example 2

Firstly, monomers EGPEA and EGPEMA are uniformly mixed according to the mole ratio of 1:1; cross-linking agent EGDMA with the mole ratio of 3% is added into the mixture; initiator AIBN with the mass ratio of 0.5% is added into the mixture; the mixture is stirred and mixed; meanwhile, nitrogen is introduced to remove oxygen therein; and the obtained product is added at a constant temperature of 75 degree centigrade and reacts for 24 hours to obtain the copolymer. The shape memory transition temperature (Tg) of the copolymer is 31 degree centigrade in test.

Secondly, the above prepared EGPEA/EGPEMA copolymer is adopted to prepare primary post spacers on a CF substrate of an LCD panel; common spacer preparation materials are adopted to prepare auxiliary post spacers on the CF substrate; and the height of the auxiliary spacers on the CF element is lower than that of the primary spacers. The CF substrate has been provided with a black matrix and CF units. The primary post spacers and the auxiliary spacers are prepared by a photolithographic method.

Thirdly, sealant is coated along the periphery of the CF substrate; the CF substrate and an array substrate are combined to form a liquid crystal cell; liquid crystals are added into the liquid crystal cell; and hence the LCD panel is obtained.

In addition, a touch panel is prepared and bonded and fixed on a display side of the LCD panel, and hence a touch screen panel is obtained.

Then, the manufactured touch screen panel is tested. The touch screen panel is charged and a display signal is input into the touch screen panel. At this point, the touch screen panel is pressed by a finger or a touch pen, and whether the touch screen panel has the Mura phenomenon is observed. As shown by the test result, the touch screen panel in the example has no observable Mura phenomenon.

Example 3

Firstly, monomers EGPEA and EGPEMA are uniformly mixed according to the mole ratio of 2:3; cross-linking agent EGDMA with the mole ratio of 2% is added into the mixture; initiator AIBN with the mass ratio of 0.5% is added into the mixture; the mixture is stirred and mixed; meanwhile, nitrogen is introduced to remove oxygen therein; and the obtained product is added at a constant temperature of 75 degree centigrade and reacts for 24 hours to obtain the copolymer. The shape memory transition temperature (Tg) of the copolymer is 30.8 degree centigrade.

Secondly, the above prepared EGPEA/EGPEMA copolymer is adopted to prepare primary post spacers and auxiliary spacers on a CF substrate of an LCD panel. The CF substrate has been provided with a black matrix and CF units. The primary post spacers and the auxiliary spacers are prepared by a gray-tone photolithographic method.

Thirdly, sealant is coated along the periphery of the CF substrate; the CF substrate and an array substrate are combined to form a liquid crystal cell; liquid crystals are added into the liquid crystal cell; and hence the LCD panel is obtained. The LCD panel is an in-cell capacitive touch panel.

In addition, the manufactured touch screen panel is tested. The touch screen panel is charged and a display signal is input into the touch screen panel. At this point, the touch screen panel is pressed by a finger or a touch pen, and whether the touch screen panel has the Mura phenomenon is observed. As shown by the test result, the touch screen panel in the example has no observable Mura phenomenon.

The LCD device provided by at least one embodiment of the present disclosure may be any product or component with display function, e.g., a mobile phone, a tablet computer, a television, a display, a notebook computer, a digital picture frame, a navigator or a watch.

In the LCD device provided by an embodiment of the present disclosure, as an SMP material is adopted to prepare the post spacers to maintain the cell gap of the liquid crystal cell, even if the post spacers are deformed due to the action of the external force in the manufacturing process of the LCD device and there is a specific distance between the post spacers and the opposite substrate, when the LCD device works, the temperature of the areas provided with the deformed post spacers is raised, so that the shape of the deformed post spacers can be restored to the previous shape due to the shape-memory effect, so as to support the opposite substrate and maintain the uniform cell gap. Moreover, the Mura phenomenon of the LCD device can be avoided or at least alleviated and the display quality of the LCD device can be improved. Specifically, if the LCD device provided by the embodiment of the present disclosure is a touch screen panel, the Mura phenomenon caused by the pressing operation of the finger and the touch pen in the use process of the touch screen panel can be eliminated or weakened, and the display quality of the touch screen panel can be improved.

The foregoing is only the preferred embodiments of the present disclosure and not intended to limit the scope of protection of the present disclosure. The scope of protection of the present disclosure should be defined by the appended claims.

What is claimed is:

1. A liquid crystal display (LCD) panel, comprising:
a first substrate and a second substrate arranged oppositely to form a liquid crystal cell; and
post spacers disposed between the first substrate and the second substrate,
wherein the post spacers are prepared by a shape memory polymer (SMP) material, the SMP material is ethylene glycol phenyl ether acylate (EGPEA)/ethylene glycol phenyl ether methacrylate (EGPEMA) copolymer; and one end of the post spacers is disposed on the first substrate and the other end is opposite to the second substrate.

2. The LCD panel according to claim 1, wherein the shape memory transition temperature of the SMP material is 20 to 45 degree centigrade.

3. The LCD panel according to claim 1, wherein the first substrate is an array substrate or an opposing substrate arranged opposite to the array substrate.

4. The LCD panel according to claim 1, further comprising auxiliary spacers disposed on the first substrate, wherein the height of the auxiliary spacers on the first substrate is lower than that of the post spacers.

5. The LCD panel according to claim 1, wherein the first substrate is an array substrate or an opposing substrate arranged opposite to the array substrate.

6. The LCD panel according to claim 1, further comprising auxiliary spacers disposed on the first substrate, wherein the height of the auxiliary spacers on the first substrate is lower than that of the post spacers.

7. A liquid crystal display (LCD) device, comprising the LCD panel according to claim 1.

8. The LCD device according to claim 7, further comprising a backlight module disposed on a non-display side of the LCD panel.

9. The LCD device according to claim 7, further comprising a touch panel disposed on a display side of the LCD panel.

10. The LCD device according to claim 7, further comprising a touch electrode structure which is at least partially formed on the first substrate or the second substrate of the LCD panel.

11. The LCD device according to claim 8, further comprising a touch panel disposed on a display &de of the LCD panel.

12. The LCD device according to claim 8, further comprising a touch electrode structure which is at least partially formed on the first substrate or the second substrate of the LCD panel.

13. A method for manufacturing a liquid crystal display (LCD) panel, comprising:

providing a first substrate;

preparing post spacers on the first substrate with a shape memory polymer (SMP) material, wherein the SMP material is ethylene glycol phenyl ether acylate (EG-PEA)/ethylene glycol phenyl ether methacrylate (EG-PEMA) copolymer; and providing a second substrate and arranging the second substrate and the first substrate oppositely to form a liquid crystal cell, wherein the post spacers are interposed between the first substrate and the second substrate.

14. The manufacturing method according to claim 13, wherein the shape memory transition temperature of the SMP material is 20 to 45 degree centigrade.

15. The manufacturing method according to claim 13, further comprising: preparing auxiliary spacers on the first substrate, wherein the height of the auxiliary spacers on the first substrate is lower than that of the post spacers.

16. The manufacturing method according to claim 13, wherein the first substrate is an array substrate or an opposing substrate arranged opposite to the array substrate.

* * * * *